United States Patent Office 3,263,469
Patented August 2, 1966

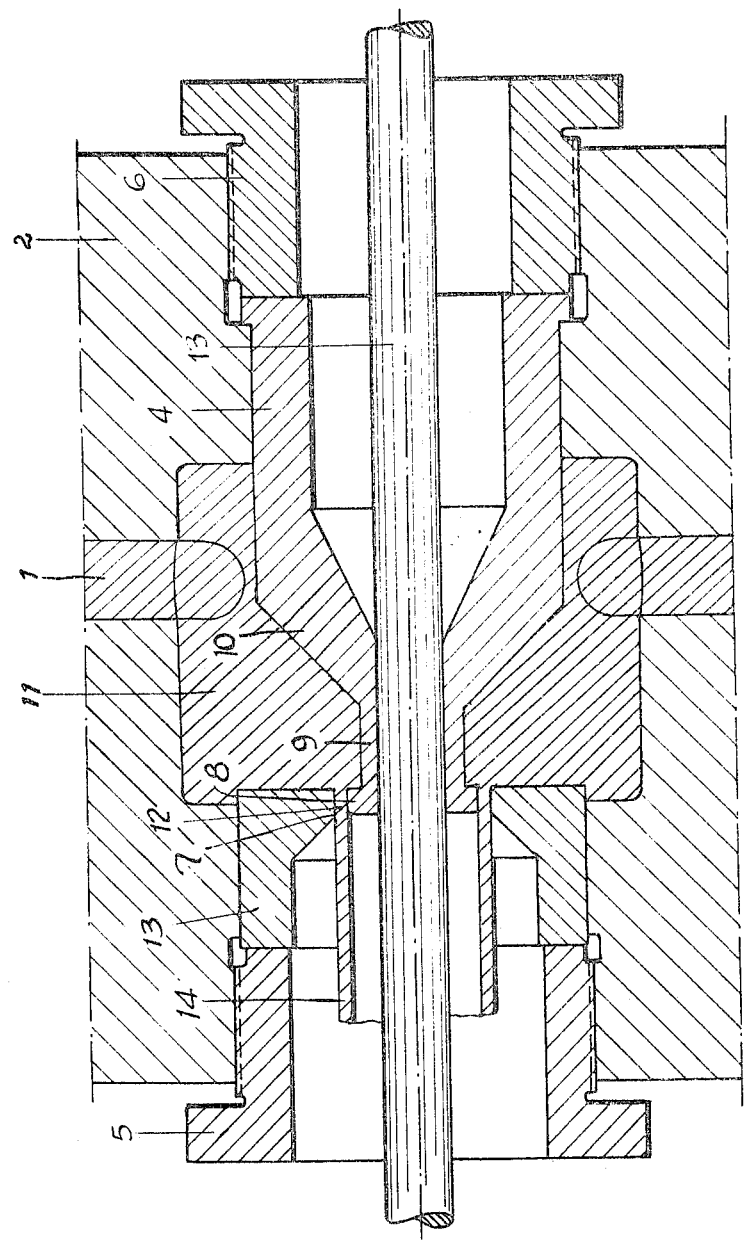

3,263,469
TUBE-EXTRUSION AND CABLE-
SHEATHING PRESSES
Karl Seidel, Moers, Germany, assignor to Schloemann
Aktiengesellschaft, Dusseldorf, Germany
Filed June 10, 1964, Ser. No. 374,002
Claims priority, application Germany, June 27, 1963,
Sch 33,467
2 Claims. (Cl. 72—269)

This invention relates to a tube press, particularly a cable-sheathing press, of the single-billet or double-billet construction, with a constant hollow cylindrical annular gap, for the production of tubes or cable sheaths.

A hollow cylindrical construction of the annular gap has the advantage that in a brief interruption of the extrusion operation, no changes of diameter and wall thickness (bambo rings) occur on the extruded product, as is the case with a hollow conical formation of the annular gap.

The hollow cylindrical annular gap is obtained in a known manner by the fact that the die is provided with a bore of constant diameter, and the mandrel, tapering conically within the extrusion chamber, is cylindrically constructed in the region of the bore of the die. Owing to the conical taper of the mandrel right into the neighbourhood of the die, a particularly strongly marked flow of extrusion material directed towards the axis of the mandrel is obtained, which remains operative even within the annular gap, and, after leaving the annular gap, occasions relatively to the latter a reduction in the diameter of the extruded product. In the sheathing of cables, this reduction in diameter has the special advantage that the sheath is pressed firmly on to the cable core. The reduction in the diameter of the extruded product after leaving the annular gap proves disadvantageous however when a definite diameter of tube or sheath is required. In this case the sheath-forming annular gap for the required tube or sheath diameter has to be determined empirically.

The object of the invention, with a view to obviating the empirical determination from time to time of the annular gap for a given diameter of tube, consists in preventing the reduction in the diameter of the extruded product after leaving the annular gap, in order that the diameter of the tube or sheath of the finished extruded product may correspond each time to that of the sheath-forming annular gap.

According to the invention this is attained by constructing the cylindrical portion of the mandrel, projecting into the die, as a collar. At a position preceding the collar in the direction of flow, there is located, conditioned by the collar, an annular surface perpendicular to the mandrel axis, and extrusion material flows conically outwards along this annular surface to the annular gap, whereby a component of the flow of the extrusion material directed away from the axis is obtained, which counteracts the flow component, occasioned by the conicity, moving inwards towards the axis of the mandrel, so that upon entering the cylindrical annular gap, and in the gap itself, the only effective flow component is parallel to the mandrel axis. Hence there can no longer be any forces acting upon the extrusion material issuing from the annular gap in such a way as to diminish its diameter, apart from the unavoidable shrinkage of the material as it cools. This has the further advantage that the particular press head for relatively large tube and cable diameters can be utilised. Finally, the forces required for extrusion are also smaller.

The beginning of the collar may advantageously be located in one plane with the wall of the die at the entry end. Moreover it has been found to be advantageous if the collar of the cylindrical portion of the mandrel extends over the entire length of the shaping bore of the die, and terminates with the latter at both ends.

In a further development of the invention the region of the mandrel preceding the collar in the direction of flow of the extrusion material, is also cylindrically constructed. This cylindrical portion of the mandrel preceding the die is to be at least twice as long as the shaping die bore, in order to obtain an effective flow of extrusion material conically away from the axis, that is, in an outward direction, at the annular surface located before the collar in the direction of flow.

One constructional example of the invention is illustrated in the accompanying drawing, which shows an axial section of the middle portion of a double-billet press.

The press head 2, provided with inlet ducts 1, carries the die 3 and the hollow mandrel 4, both of which are secured in the press head 2 by hollow screws 5 and 6. The bore 7 of the die, which shapes the external diameter of the sheath, is cylindrically constructed, and along the length thereof extends the cylindrical collar 8 of the mandrel 4. At both ends the collar 8 terminates with the shaping die bore 7. The collar 8 is preceded by a further cylindrical portion 9 of the mandrel. Following upon this the mandrel is conically widened in the region 10. The extrusion material flowing through the inlet passage 1 into the extrusion chamber 11 flows into the annular gap 12 from all sides, that is, not only in an axial direction and in a radially inward direction but also in a radially outward direction, so that no characteristic flow directed towards the mandrel axis 13 can adjust itself. The issuing tube 14 therefore has the same dimensions as the annular gap 12.

I claim:

1. An extrusion press for the production of tubular cable sheaths, comprising: a press head, a die, formed with a cylindrical die aperture, mounted in the press head, a hollow mandrel in the press head, the mandrel having a portion of its external surface tapering conically towards the die and an externally cylindrical portion extending from the conical portion to the die, an extrusion chamber enclosed in the press head and surrounding the cylindrical and conical external surfaces of the mandrel, and a cylindrical collar at the inner end of the cylindrical portion of the mandrel, the axial length of this collar being equal to the axial length of the die aperture, and the front and rear surfaces of the collar registering with the front and rear ends of the die aperture.

2. An extrusion press for the production of tubular cable sheaths as claimed in claim 1, the externally cylindrical portion of the mandrel immediately preceding the collar being at least twice as long as the shaping bore of the die.

References Cited by the Examiner
UNITED STATES PATENTS 407,384    7/1889    Wicks _____ 72—269
2,135,194  11/1938   Underhill _____ 72—269

CHARLES W. LANHAM, Primary Examiner.

E. D. O'CONNOR, H. D. HOINKES, Examiners.